United States Patent
He et al.

(10) Patent No.: US 11,620,023 B1
(45) Date of Patent: Apr. 4, 2023

(54) TOUCH EVENT PROCESSING CIRCUIT

(71) Applicant: HIMAX TECHNOLOGIES LIMITED, Tainan (TW)

(72) Inventors: Jia-Ming He, Tainan (TW); Yaw-Guang Chang, Tainan (TW); Yi-Yang Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/727,830

(22) Filed: Apr. 25, 2022

(51) Int. Cl.
*G06F 3/044* (2006.01)
*G06F 3/041* (2006.01)

(52) U.S. Cl.
CPC .......... *G06F 3/044* (2013.01); *G06F 3/04182* (2019.05)

(58) Field of Classification Search
CPC ............................. G06F 3/044; G06F 3/04182
See application file for complete search history.

(56) References Cited

U.S. PATENT DOCUMENTS

| | | | |
|---|---|---|---|
| 2012/0013564 A1* | 1/2012 | Westhues | G06F 3/0446 345/174 |
| 2014/0009216 A1* | 1/2014 | Jo | H03K 17/962 327/517 |
| 2014/0015768 A1* | 1/2014 | Karpin | G06F 3/04182 345/173 |
| 2015/0084923 A1* | 3/2015 | Kang | G06F 3/0446 345/174 |

* cited by examiner

*Primary Examiner* — Hong Zhou
(74) *Attorney, Agent, or Firm* — Winston Hsu

(57) ABSTRACT

A touch event processing circuit includes a plurality of receiving circuits and an average circuit. Each of the plurality of receiving circuits includes a first integrator circuit, a resistor, and a touch event detection circuit. The first integrator circuit is arranged to receive an input signal that includes a voltage sensing signal from a touch panel, and output a first integrated voltage signal. The resistor has a first terminal coupled to an output terminal of the first integrator circuit and a second terminal. The touch event detection circuit is arranged to detect a touch event according to the output from the second terminal of the resistor and a voltage average signal. The average circuit is arranged to: receive a plurality of first integrated voltage signals from the plurality of receiving circuits; and perform an average operation upon the plurality of first integrated voltage signals, to generate the voltage average signal.

13 Claims, 4 Drawing Sheets

TOUCH EVENT PROCESSING CIRCUIT

BACKGROUND OF THE INVENTION

1. Field of the Invention

The present invention is related to a touch event processing circuit, and more particularly, to a touch event processing circuit that may utilize an average signal of a plurality of receiving circuits to cancel noise interference.

2. Description of the Prior Art

As technology develops, a touch event processing circuit is a circuit that will be found inmost cellphones. Since the cellphones are getting thinner and lighter (e.g. the recently developed foldable cellphone utilizes a flexible AMOLED panel), the distance between a touch panel and a display panel in a cellphone is getting closer (i.e. parasitic capacitance between the touch panel and the display panel is getting larger), which causes the display panel to introduce lots of noise, and makes the touch event processing circuit more susceptible to noise interference. As a result, a novel touch event processing circuit that may cancel noise interference is urgently needed.

SUMMARY OF THE INVENTION

It is therefore one of the objectives of the present invention to provide a touch event processing circuit that may utilize an average signal of a plurality of receiving circuits to cancel noise interference, to address the above-mentioned problems.

According to an embodiment of the present invention, a touch event processing circuit is provided. The touch event processing circuit may include a plurality of receiving circuits and an average circuit, wherein each of the plurality of receiving circuits may include a first integrator circuit, a resistor, and a touch event detection circuit. The first integrator circuit may include a first input terminal, a second input terminal, and an output terminal, wherein the first input terminal may be arranged to receive an input signal that may include a voltage sensing signal from a touch panel, the second input terminal may be arranged to receive a reference voltage, and the output terminal may be arranged to output a first integrated voltage signal. The resistor may have a first terminal coupled to the output terminal of the first integrator circuit and a second terminal. The touch event detection circuit may be arranged to receive an output from the second terminal of the resistor and a voltage average signal, and arranged to detect a touch event according to the output from the second terminal of the resistor and the voltage average signal. The average circuit may be coupled to the plurality of receiving circuits and the touch event detection circuit, and arranged to: receive a plurality of first integrated voltage signals from the plurality of receiving circuits; and perform an average operation upon the plurality of first integrated voltage signals, to generate the voltage average signal.

According to another embodiment of the present invention, a touch event processing circuit is provided. The touch event processing circuit may include a plurality of receiving circuits and an average circuit, wherein each of the plurality of receiving circuits may include a first integrator circuit, a voltage to current conversion circuit, a current processing circuit, and a touch event detection circuit. The first integrator circuit may include a first input terminal, a second input terminal, and an output terminal, wherein the first input terminal may be arranged to receive an input signal that may include a voltage sensing signal from a touch panel, the second input terminal may be arranged to receive a first reference voltage, and the output terminal may be arranged to output an integrated voltage signal. The voltage to current conversion circuit may be coupled to the output terminal of the first integrator circuit, and arranged to convert the integrated voltage signal, to generate a current conversion signal. The current processing circuit may be coupled to the voltage to current conversion circuit, and arranged to process the current conversion signal according to a current average signal, to generate a processed current signal. The touch event detection circuit may be coupled to the current processing circuit, and arranged to receive the processed current signal and a second reference voltage, and detect a touch event according to the processed current signal and the second reference voltage. The average circuit may be coupled to a plurality of voltage to current conversion circuits in the plurality of receiving circuits and the current processing circuit, and arranged to: receive a plurality of current conversion signals from the plurality of voltage to current conversion circuits; and perform an average operation upon the plurality of current conversion signals, to generate the current average signal.

One of the benefits of the present invention is that, by the touch event processing circuit of the present invention, if the input signal further comprises a noise signal, the noise signal may be canceled after average cancellation is preformed according to an average signal (e.g. a voltage average signal or a current average signal). In addition, the mutual capacitance may also be canceled after the average cancellation is preformed according to the average signal (e.g. the voltage average signal or the current average signal), which may greatly improve the signal-to-noise ratio (SNR) and the performance of an analog to digital converter (ADC).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
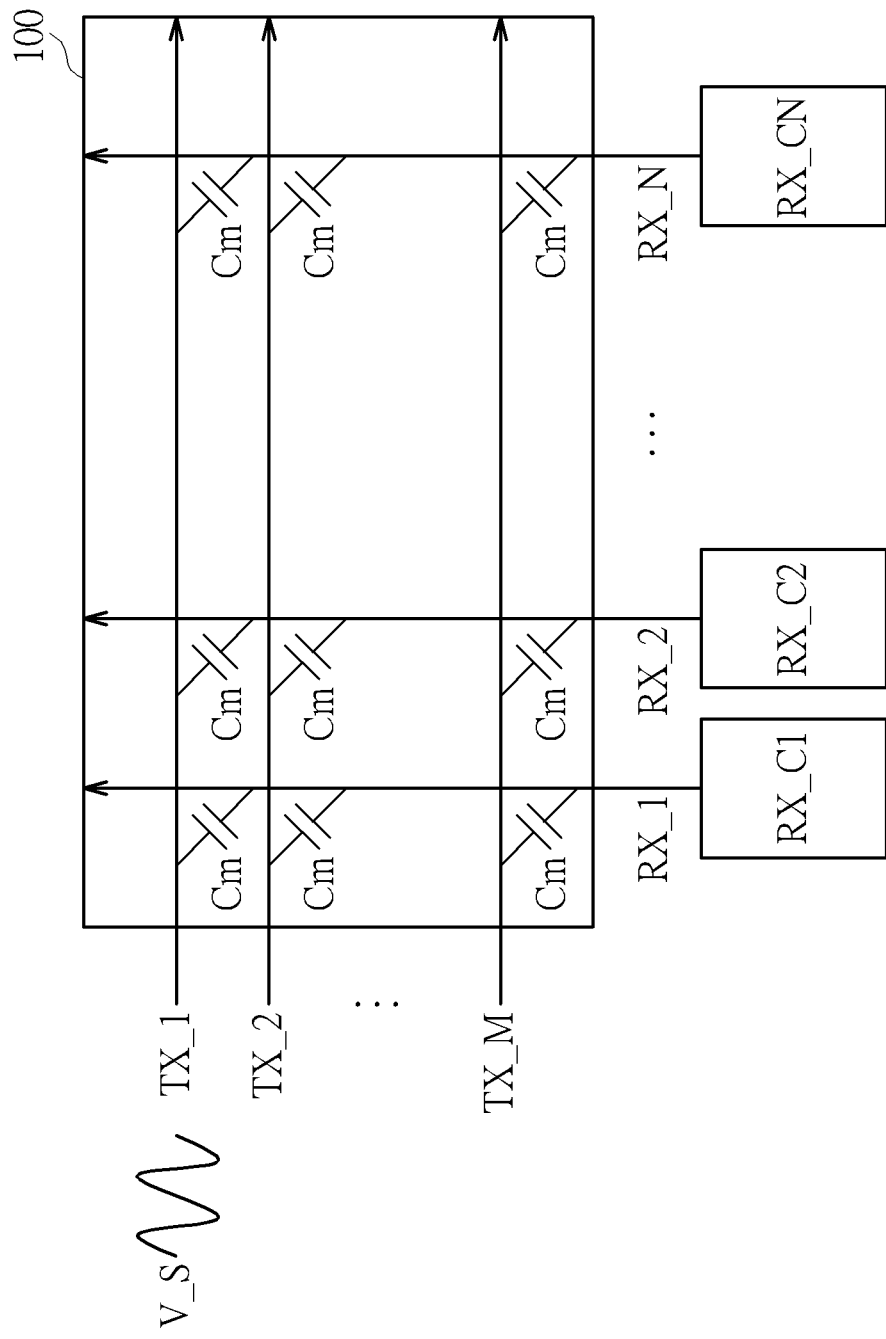
FIG. 1 is a diagram illustrating a touch panel according to an embodiment of the present invention.

FIG. 1 is a diagram illustrating a touch panel 100 according to an embodiment of the present invention. For example, the touch panel 100 may be a mutual capacitive touch panel (e.g. an AMOLED panel). As shown in FIG. 1, the touch panel 100 may include a plurality of transmitting channels, such as M transmitting channels $TX\_1$, $TX\_2$, . . . , and $TX\_M$, and a plurality of receiving channels, such as N receiving channels $RX\_1$, $RX\_2$, . . . , and $RX\_N$, wherein both of "M" and "N" may represent a positive integer that is greater than one. The receiving channels $RX\_1$-$RX\_N$ may cross the transmitting channels TX_1-TX_M, and may be coupled to a plurality of receiving circuits RX_C1, RX_C2, . . . , and RX_CN, respectively. It should be noted that, there is no physical contact at an intersection of one receiving channel and one transmitting channel. Hence, a mutual capacitance Cm may be formed at an intersection of each of the transmitting channels TX_1-TX_M and each of the receiving channels RX_1-RX_N. When a touch event occurs on the touch panel 100, a capacitance value of the mutual capacitance Cm that is at a position of the touch event occurrence may vary. The receiving circuits RX_C1-RX_CN may be arranged to detect the touch event according to the variation of the capacitance value of the mutual capacitance Cm.

Figure 2:
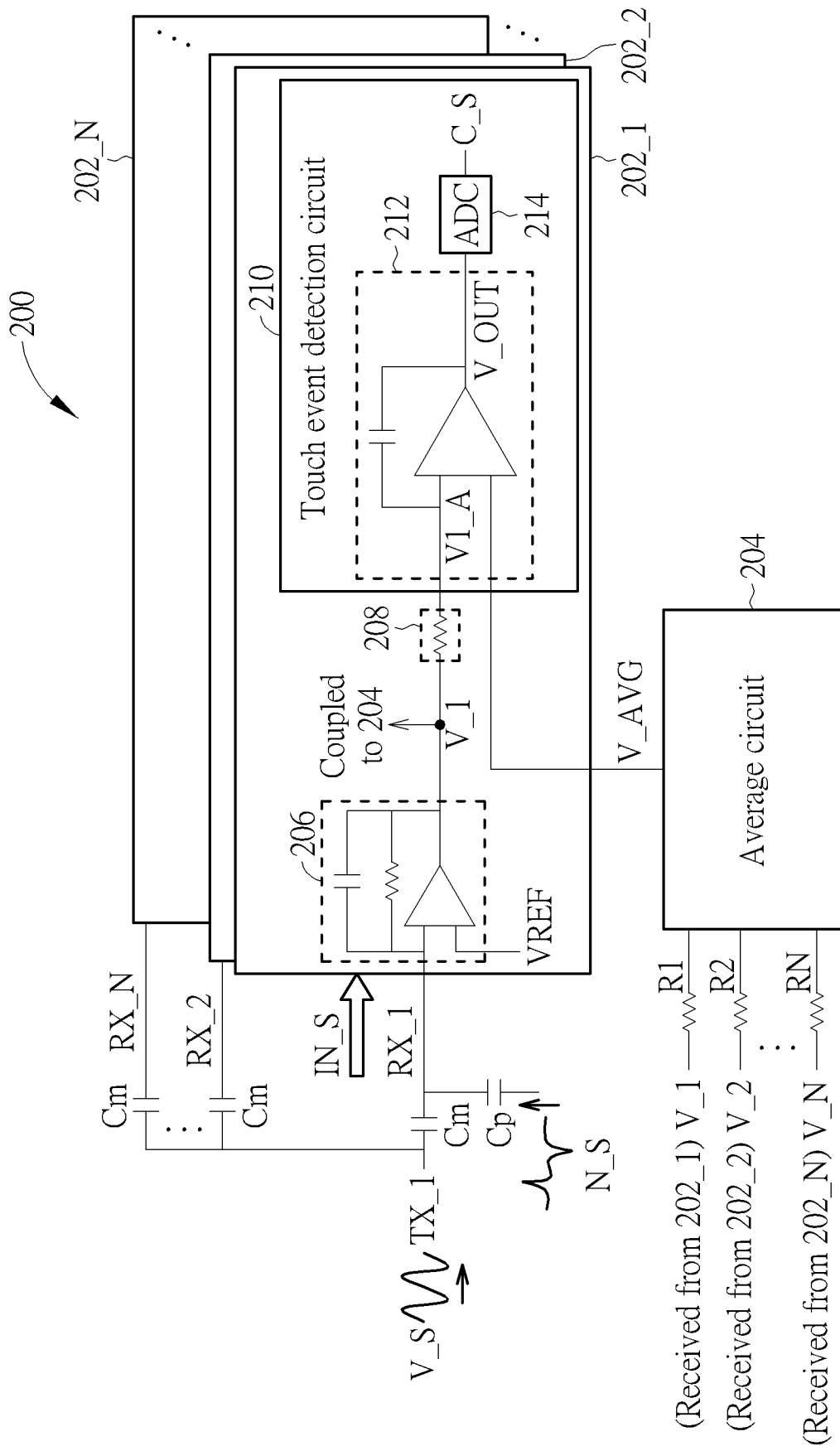
FIG. 2 is a diagram illustrating a touch event processing circuit according to an embodiment of the present invention.

FIG. 2 is a diagram illustrating a touch event processing circuit 200 according to an embodiment of the present invention. As shown in FIG. 2, the touch event processing circuit 200 may include a plurality of receiving circuits 202_1, 202_2, . . . , 202_N and an average circuit 204, wherein "N" may represent a positive integer that is greater than one. The receiving circuits 202_1-202_N may be implemented by the receiving circuits RX_C1-RX_CN shown in FIG. 1, respectively, and may be arranged to receive an input signal IN_S, wherein the input signal IN_S may include a voltage sensing signal V_S from only one transmitting channel TX_1. In addition, there is a parasitic capacitance Cp between the touch panel 100 and a display panel (not shown), and a noise signal N_S may be introduced from the display panel (not shown) to the touch panel 100, but the present invention is not limited thereto. For example, when the display panel (not shown) is changing the screen to be displayed, the noise signal N_S may be generated, and may be coupled from the display panel (not shown) to the touch panel 100 through the parasitic capacitance Cp. As a result, the input signal IN_S may further include the noise signal N_S (i.e. the input signal IN_S may include the voltage sensing signal V_S and the noise signal N_S).

For example, it is assumed that the voltage sensing signal V_S is 5 V, the noise signal N_S is 0.1 V, the mutual capacitance Cm is 1 pF, and the parasitic capacitance Cp is 500 pF. In this situation, the charge amount of the voltage sensing signal V_S is 5 pC (1 pF*5 V), and the charge amount of the noise signal N_S is 50 pC (500 pF*0.1 V), wherein the charge amount of the noise signal N_S is much larger than that of the voltage sensing signal V_S, which will affect the detection of the touch event. The touch event processing circuit 200 of the present invention may be provided to address this issue.

In this embodiment, each of the receiving circuits 202_1-202_N may have the same architecture, including an integrator circuit, a resistor, and a touch event detection circuit. Take the receiving circuit 202_1 as an example. The receiving circuit 202_1 may include an integrator circuit 206, a resistor 208, and a touch event detection circuit 210. The integrator circuit 206 may include a first input terminal, a second input terminal, and an output terminal, wherein the first input terminal may be arranged to receive the input signal IN_S (which may include the voltage sensing signal V_S and the noise signal N_S), the second input terminal may be arranged to receive a reference voltage VREF, the output terminal may be arranged to output a first integrated voltage signal V_1, and the reference voltage VREF may be determined according to the design requirements. The resistor 208 may have a first terminal and a second terminal, where the first terminal is coupled to the output terminal of the integrator circuit 206, and the second terminal is coupled to the touch event detection circuit 210.

The average circuit 204 may be coupled to the receiving circuits 202_1-202_N (more particularly, the first terminal of the resistor in each of the receiving circuits 202_1-202_N; for example, the first terminal of the resistor 208 in the receiving circuit 202_1) and the touch event detection circuit 210, and may be arranged to: receive a plurality of first integrated voltage signals V_1, V_2, . . . , V_N from the receiving circuits 202_1-202_N, respectively, wherein the first integrated voltage signal V_1 is received from the receiving circuit 202_1, the first integrated voltage signal V_2 is received from the receiving circuit 202_2, and the first integrated voltage signal V_N is received from the receiving circuit 202_N; and perform an average operation upon the first integrated voltage signals V_1-V_N, to generate a voltage average signal V_AVG. In addition, there is a resistor between each of the receiving circuits 202_1-202_N and the average circuit 204 for preventing from short circuits (e.g. a resistor R1 corresponding to the receiving circuit 202_1, a resistor R2 corresponding to the receiving circuit 202_2, and a resistor RN corresponding to the receiving circuit 202_N). It should be noted that, if the input signal IN_S includes the noise signal N_S, each of the receiving channels RX_1, RX_2, . . . , RX_N will receive the same noise signal N_S (i.e. each of the first integrated voltage signals V_1-V_N will include the same noise signal N_S). As a result, the average result of the first integrated voltage signals V_1-V_N (i.e. the voltage average signal V_AVG) will include the same noise signal N_S.

The touch event detection circuit 210 may be arranged to receive an output from the second terminal of the resistor 208 (for brevity, hereafter referred to as "a voltage signal V1_A") and the voltage average signal V_AVG, and arranged to detect a touch event according to the voltage signal V1_A and the voltage average signal V_AVG. The touch event detection circuit 210 may include an integrator circuit 212 and an analog to digital converter (ADC) 214. The integrator circuit 212 may include a first input terminal, a second input terminal, and an output terminal, wherein the first input terminal may be coupled to the second terminal of the resistor 208, and may be arranged to receive the voltage signal V1_A; the second input terminal may be coupled to the average circuit 204, and may be arranged to receive the voltage average signal V_AVG; and the output terminal may be arranged to output a second integrated voltage signal V_OUT to the ADC 214. It should be noted that, since the first integrated voltage signal V1 and the voltage average signal V_AVG have the same noise signal N_S (i.e. the same noise signal N_S is presented at both input terminals of the integrator circuit 212), the noise signal N_S may be canceled after the second integrated voltage signal V_OUT is output according to the voltage signal V1_A and the voltage average signal V_AVG by the integrator circuit 212.

The ADC 214 may be coupled to the output terminal of the integrator circuit 212, and arranged to perform analog-to-digital conversion upon the second integrated voltage signal V_OUT in an analog domain, to generate a converted signal C_S in a digital domain. The touch event detection circuit 210 may be arranged to detect the touch event according to the converted signal C_S. Since the operation of the ADC 214 is well known to those with ordinary knowledge in the art, the details of the ADC 214 will be omitted for brevity.

Figure 3:
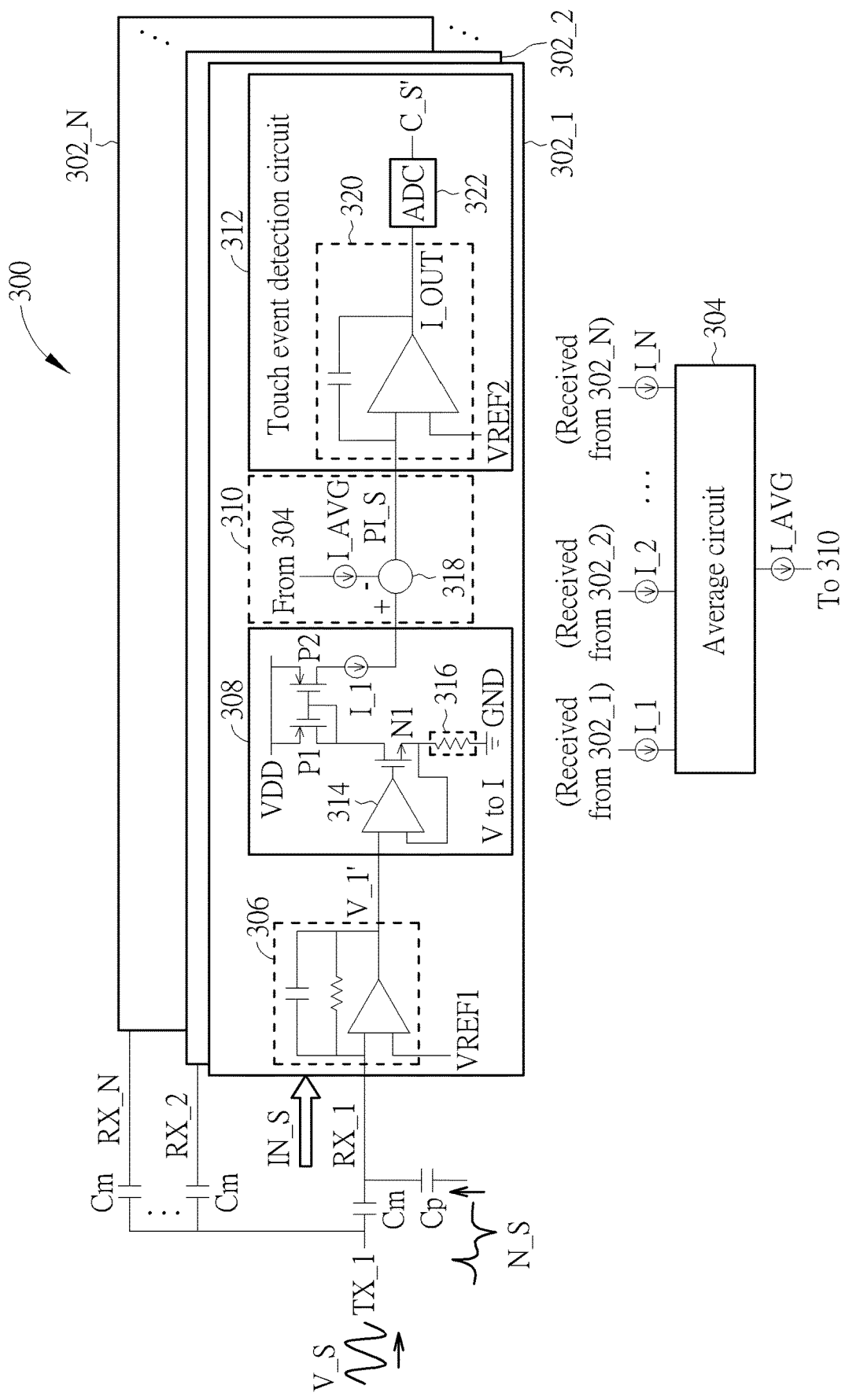
FIG. 3 is a diagram illustrating a touch event processing circuit according to another embodiment of the present invention.

FIG. 3 is a diagram illustrating a touch event processing circuit 300 according to another embodiment of the present invention. As shown in FIG. 3, the touch event processing circuit 300 may include a plurality of receiving circuits 302_1, 302_2, ..., 302_N and an average circuit 304, wherein "N" may represent a positive integer that is greater than one. The receiving circuits 302_1-302_N may be implemented by the receiving circuits RX_C1-RX_CN shown in FIG. 1, respectively, and may be arranged to receive an input signal IN_S, wherein the input signal IN_S may include a voltage sensing signal V_S (which may be from only one transmitting channel TX_1) and a noise signal N_S (which may be coupled from a display panel (not shown) to the touch panel 100 through the parasitic capacitance Cp).

In this embodiment, each of the receiving circuits 302_1-302_N may have the same architecture, including an integrator circuit, a voltage to current conversion circuit, a current processing circuit, and a touch event detection circuit. Take the receiving circuit 302_1 as an example. The receiving circuit 302_1 may include an integrator circuit 306, a voltage to current conversion circuit 308 (for brevity, labeled as "V to I" in FIG. 3), a current processing circuit 310, and a touch event detection circuit 312. The integrator circuit 306 may include a first input terminal, a second input terminal, and an output terminal, wherein the first input terminal may be arranged to receive the input signal IN_S (which may include the voltage sensing signal V_S and the noise signal N_S), the second input terminal may be arranged to receive a first reference voltage VREF1, the output terminal may be arranged to output an integrated voltage signal V_1', and the first reference voltage VREF1 may be determined according to the design requirements.

The voltage to current conversion circuit 308 may be coupled to the output terminal of the integrator circuit 306, and may be arranged to convert the integrated voltage signal V_1', to generate a current conversion signal I_1. For example, the voltage to current conversion circuit 308 may include an operation amplifier 314, a plurality of P-type transistors P1 and P2, an N-type transistor N1, and a resistor 316. The operation amplifier 314 has a first input terminal coupled to the output terminal of the integrator circuit 306, a second input terminal, and an output terminal. The P-type transistor P1 has a source terminal coupled to a second reference voltage (e.g. a supply voltage VDD) and a gate terminal coupled to a drain terminal of the P-type transistor P1. The P-type transistor P2 has a source terminal coupled to the second reference voltage (e.g. the supply voltage VDD), and a gate terminal coupled to the gate terminal of the P-type transistor P1. The N-type transistor N1 has a source terminal coupled to the second input terminal of the operation amplifier 314, a gate terminal coupled to the output terminal of the operation amplifier 314, and a drain terminal coupled to the drain terminal of the P-type transistor P1. The resistor 316 has a first terminal coupled to the source terminal of the N-type transistor N1, and a second terminal coupled to a third reference voltage (e.g. a ground voltage GND). It should be noted that, the current conversion signal I_1 is output from a drain terminal of the P-type transistor P2.

The average circuit 304 may be coupled to a plurality of voltage to current conversion circuits in the receiving circuits 302_1-302_N_(more particularly, the drain terminal of the P-type transistor P2 included in the current conversion circuit in each of the receiving circuits 302_1-302_N; for example, the drain terminal of the P-type transistor P2 included in the voltage to current conversion circuit 308 in the receiving circuit 302_1) and the current processing circuit 310, and may be arranged to: receive a plurality of current conversion signals I_1, I_2, ..., I_N from the receiving circuits 302_1-302_N, respectively, wherein the current conversion signal I_1 is received from the receiving circuit 302_1, the current conversion signal I_2 is received from the receiving circuit 302_2, and the current conversion signal I_N is received from the receiving circuit 302_N; and perform an average operation upon the current conversion signals I_1-I_N, to generate a current average signal I_AVG.

The current processing circuit 310 may be coupled to the voltage to current conversion circuit 308 and the average circuit 304, and may be arranged to process the current conversion signal I_1 according to the current average signal I_AVG, to generate a processed current signal PI_S. For example, the current processing circuit 310 may include a subtraction circuit 318, and the subtraction circuit 318 may be coupled to the drain terminal of the P-type transistor P2 in the voltage to current conversion circuit 308 and the average circuit 304, and may be arranged to subtract the current average signal I_AVG from the current conversion signal I_1, to generate the processed current signal PI_S. It should be noted that, if the input signal IN_S includes the noise signal N_S, each of the receiving channels RX_1, RX_2, ..., RX_N will receive the same noise signal N_S (i.e. each of the current conversion signals I_1-I_N will include the same noise signal N_S), and the average result of the current conversion signals I_1-I_N_(i.e. the current average signal I_AVG) will include the same noise signal N_S. Since the current conversion signal I_1 and the current average signal I_AVG have the same noise signal N_S, the noise signal N_S may be canceled after the processed current signal PI_S is generated by subtracting the current average signal I_AVG from the current conversion signal I_1.

The touch event detection circuit 312 may be coupled to the current processing circuit 310, and may be arranged to receive the processed current signal PI_S, and detect a touch event according to the processed current signal PI_S. The touch event detection circuit 312 may include an integrator circuit 320 and an ADC 322. The integrator circuit 320 may include a first input terminal, a second input terminal, and an output terminal, wherein the first input terminal may be coupled to the current processing circuit 310 (more particularly, the subtraction circuit 318), and may be arranged to receive the processed current signal PI_S; the second input terminal may be arranged to receive a fourth reference voltage VREF2; the output terminal may be arranged to output an integrated current signal I_OUT; and the fourth reference voltage VREF2 may be determined according to the design requirements. The ADC 322 may be coupled to the output terminal of the integrator circuit 320, and may be arranged to perform analog-to-digital conversion upon the integrated current signal I_OUT in an analog domain, to generate a converted signal C_S' in a digital domain. The touch event detection circuit 312 may be arranged to detect the touch event according to the converted signal C_S'. Since the operation of the ADC 322 is well known to those with ordinary knowledge in the art, the details of the ADC 322 will be omitted for brevity.

Figure 4:
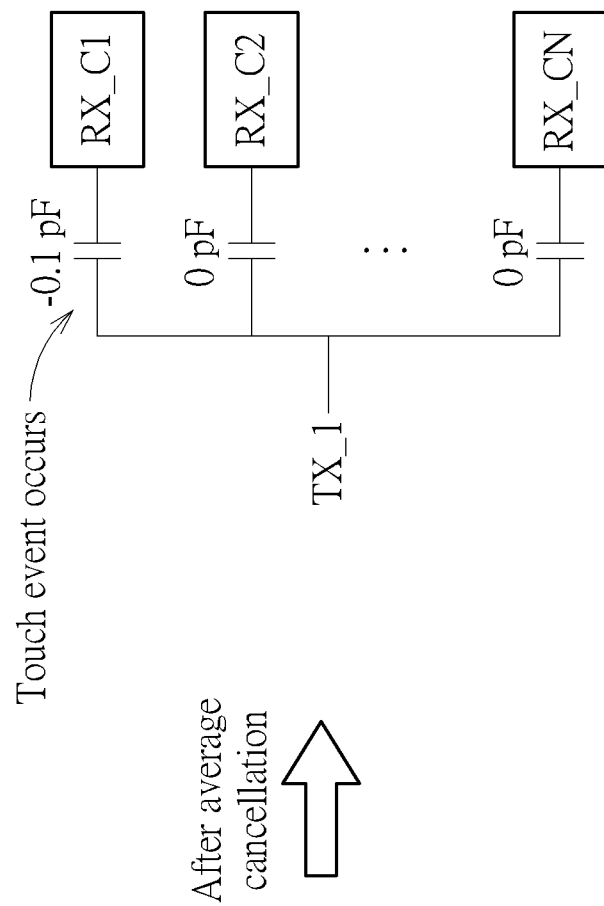
FIG. 4 is a diagram illustrating cancellation of mutual capacitances after average cancellation according to an embodiment of the present invention.
Figure 4:
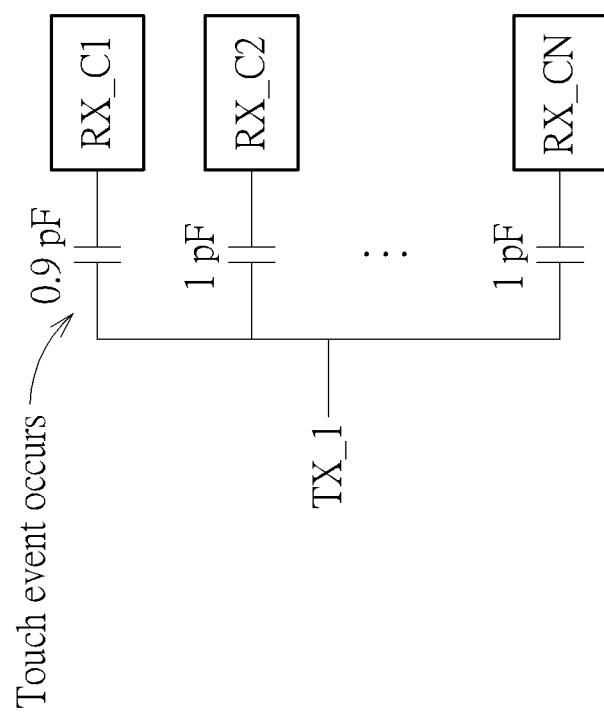

FIG. 4 is a diagram illustrating cancellation of mutual capacitances after average cancellation according to an embodiment of the present invention. As shown in FIG. 4, the capacitance value of the mutual capacitances that is formed at an intersection of the transmitting channel TX_1 and each of the receiving circuits RX_C2-RX_CN is 1 pF, and the capacitance value of the mutual capacitance that is at a position of the touch event occurrence between the transmitting channel TX_1 and the receiving circuit RX_C1 is 0.9 pF. In other words, the change in the capacitance value of the mutual capacitance Cm caused by the touch event is 0.1 pF.

For the touch event processing circuit 200 shown in FIG. 2, after the second integrated voltage signal V_OUT is output according to the voltage signal V1_A and the voltage average signal V_AVG by the integrator circuit 212 (labeled as "After average cancellation" in FIG. 4), the mutual capacitance (1 pF) at the intersection of the transmitting channel TX_1 and each of the receiving circuits RX_C1-RX_CN may be canceled. For the touch event processing circuit 300 shown in FIG. 3, after the processed current signal PI_S is generated by subtracting the current average signal I_AVG from the current conversion signal I_1 (labeled as "After average cancellation" in FIG. 4), the mutual capacitance (1 pF) at the intersection of the transmitting channel TX_1 and each of the receiving circuits RX_C1-RX_CN may be canceled. In this way, only the change in the capacitance value of the mutual capacitance caused by the touch event (0.1 pF) is remained. As a result, the ADC (e.g. the ADC 214 shown in FIG. 2 or the ADC 322 shown in FIG. 3) may only need to parse the change in the capacitance value of the mutual capacitance caused by the touch event (0.1 pF) for detecting the touch event, without parsing the complete capacitance value of the mutual capacitance (1 pF), which may greatly improve the signal-to-noise ratio (SNR) and the performance of the ADC.

In the above-mentioned embodiments, the touch event processing circuit of the present invention is applied to a mutual capacitive touch panel (e.g. an AMOLED panel), but the present invention is not limited thereto. Other types of the touch panels will also fall within the scope of the present invention. For example, in some embodiments, the touch event processing circuit of the present invention may be applied to a self-capacitive touch panel (e.g. a TDDI self-mode sensing OLED/LCD panel). For the self-capacitive touch panel, the touch event may be detected according to the variation of the capacitance value of a self-capacitance C-self, and the touch event processing circuit of the present invention may be utilized to cancel the self-capacitance C-self. In this way, only the change in the capacitance value of the self-capacitance C-self caused by the touch event is remained. For brevity, similar descriptions for the self-capacitive touch panel are not repeated in detail here.

In summary, by the touch event processing circuit of the present invention, the noise signal N_S may be canceled after average cancellation is preformed according to an average signal (e.g. the voltage average signal V_AVG or the current average signal I_AVG). For example, regarding the touch event processing circuit 200 shown in FIG. 2, the noise signal N_S may be canceled after the second integrated voltage signal V_OUT is output according to the voltage signal V1_A and the voltage average signal V_AVG by the integrator circuit 212. For another example, regarding the touch event processing circuit 300 shown in FIG. 3, the noise signal N_S may be canceled after the processed current signal PI_S is generated by subtracting the current average signal I_AVG from the current conversion signal I_1. In addition, the mutual capacitance Cm may also be canceled after the average cancellation is preformed according to the average signal (e.g. the voltage average signal V_AVG or the current average signal I_AVG), which may greatly improve the SNR and the performance of the ADC. For example, regarding the touch event processing circuit 200 shown in FIG. 2, after the second integrated voltage signal V_OUT is output according to the voltage signal V1_A and the voltage average signal V_AVG by the integrator circuit 212, the mutual capacitance Cm at the intersection of the transmitting channel TX_1 and each of the receiving circuits RX_C1-RX_CN may be canceled. For another example, regarding the touch event processing circuit 300 shown in FIG. 3, after the processed current signal PI_S is generated by subtracting the current average signal I_AVG from the current conversion signal I_1, the mutual capacitance Cm at the intersection of the transmitting channel TX_1 and each of the receiving circuits RX_C1-RX_CN may be canceled.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch event processing circuit, comprising:
   a plurality of receiving circuits, wherein each of the plurality of receiving circuits comprises:
      a first integrator circuit, comprising:
         a first input terminal, arranged to receive an input signal, wherein the input signal comprises a voltage sensing signal from a touch panel;
         a second input terminal, arranged to receive a reference voltage; and
         an output terminal, arranged to output a first integrated voltage signal;
      a resistor, having a first terminal coupled to the output terminal of the first integrator circuit and a second terminal;
      a touch event detection circuit, arranged to receive an output from the second terminal of the resistor and a voltage average signal, and arranged to detect a touch event according to the output from the second terminal of the resistor and the voltage average signal; and
   an average circuit, coupled to the plurality of receiving circuits and the touch event detection circuit, and arranged to:
      receive a plurality of first integrated voltage signals from the plurality of receiving circuits; and
      perform an average operation upon the plurality of first integrated voltage signals, to generate the voltage average signal;
   wherein the touch event detection circuit comprises:
      a second integrator circuit, comprising:
         a first input terminal, coupled to the second terminal of the resistor, and arranged to receive the output from the second terminal of the resistor;
         a second input terminal, coupled to the average circuit, and arranged to receive the voltage average signal; and
         an output terminal, arranged to output a second integrated voltage signal.

2. The touch event processing circuit of claim 1, wherein the touch event detection circuit further comprises:
   an analog to digital converter, coupled to the output terminal of the second integrator circuit, and arranged to perform conversion upon the second integrated voltage signal, to generate a converted signal;
   wherein the touch event detection circuit is arranged to detect the touch event according to the converted signal.

3. The touch event processing circuit of claim 1, wherein the touch panel comprises a plurality of transmitting channels and a plurality of receiving channels crossing the plurality of transmitting channels and coupled to the plurality of receiving circuits, respectively, a mutual capacitance is formed at an intersection of each of the plurality of transmitting channels and each of the plurality of receiving channels, and the mutual capacitance is canceled after the second integrated voltage signal is output according to the output from the second terminal of the resistor and the voltage average signal by the second integrator circuit.

4. The touch event processing circuit of claim 1, wherein the input signal further comprises a noise signal, and the noise signal is canceled after the second integrated voltage signal is output according to the output from the second terminal of the resistor and the voltage average signal by the second integrator circuit.

5. The touch event processing circuit of claim 1, wherein the touch processing circuit is applied to a mutual capacitive touch panel or a self-capacitive touch panel.

6. A touch event processing circuit comprising:
a plurality of receiving circuits, wherein each of the plurality of receiving circuits comprises:
a first integrator circuit, comprising:
a first input terminal, arranged to receive an input signal, wherein the input signal comprises a voltage sensing signal from a touch panel;
a second input terminal, arranged to receive a first reference voltage; and
an output terminal, arranged to output an integrated voltage signal;
a voltage to current conversion circuit, coupled to the output terminal of the first integrator circuit, and arranged to convert the integrated voltage signal, to generate a current conversion signal;
a current processing circuit, coupled to the voltage to current conversion circuit, and arranged to process the current conversion signal according to a current average signal, to generate a processed current signal;
a touch event detection circuit, coupled to the current processing circuit, and arranged to receive the processed current signal and a second reference voltage, and detect a touch event according to the processed current signal and the second reference voltage; and
an average circuit, coupled to a plurality of voltage to current conversion circuits in the plurality of receiving circuits and the current processing circuit, and arranged to:
receive a plurality of current conversion signals from the plurality of voltage to current conversion circuits; and
perform an average operation upon the plurality of current conversion signals, to generate the current average signal.

7. The touch event processing circuit of claim 6, wherein the voltage to current conversion circuit comprises:
an operation amplifier, having a first input terminal coupled to the output terminal of the first integrator circuit, a second input terminal, and an output terminal;

a first P-type transistor, having a source terminal coupled to a third reference voltage and a gate terminal coupled to a drain terminal of the first P-type transistor;
a second P-type transistor, having a source terminal coupled to the third reference voltage, and a gate terminal coupled to the gate terminal of the first P-type transistor;
an N-type transistor, having a source terminal coupled to the second input terminal of the operation amplifier, a gate terminal coupled to the output terminal of the operation amplifier, and a drain terminal coupled to the drain terminal of the first P-type transistor;
a resistor, having a first terminal coupled to the source terminal of the N-type transistor, and a second terminal coupled to a fourth reference voltage;
wherein the current conversion signal is output from a drain terminal of the second P-type transistor.

8. The touch event processing circuit of claim 7, wherein the current processing circuit comprises a subtraction circuit, and the subtraction circuit is coupled to the drain terminal of the second P-type transistor and the average circuit, and arranged to subtract the current average signal from the current conversion signal, to generate the processed current signal.

9. The touch event processing circuit of claim 8, wherein the touch panel comprises a plurality of transmitting channels and a plurality of receiving channels crossing the plurality of transmitting channels and coupled to the plurality of receiving circuits, respectively, a mutual capacitance is formed at an intersection of each of the plurality of transmitting channels and each of the plurality of receiving channels, and the mutual capacitance is canceled after the processed current signal is generated.

10. The touch event processing circuit of claim 8, wherein the input signal further comprises a noise signal, and the noise signal is canceled after the processed current signal is generated.

11. The touch event processing circuit of claim 6, wherein the touch event detection circuit comprises:
a second integrator circuit, comprising:
a first input terminal, coupled to the current processing circuit, and arranged to receive the processed current signal;
a second input terminal, coupled to the second reference voltage; and
an output terminal, arranged to output an integrated current signal.

12. The touch event processing circuit of claim 11, wherein the touch event detection circuit further comprises:
an analog to digital converter, coupled to the output terminal of the second integrator circuit, and arranged to perform conversion upon the integrated current signal, to generate a converted signal;
wherein the touch event detection circuit is arranged to detect the touch event according to the converted signal.

13. The touch event processing circuit of claim 6, wherein the touch processing circuit is applied to a mutual capacitive touch panel or a self-capacitive touch panel.

* * * * *